Jan. 14, 1930.  E. H. GOLD ET AL  1,743,270
HOSE COUPLER
Filed Aug. 22, 1927  4 Sheets-Sheet 2
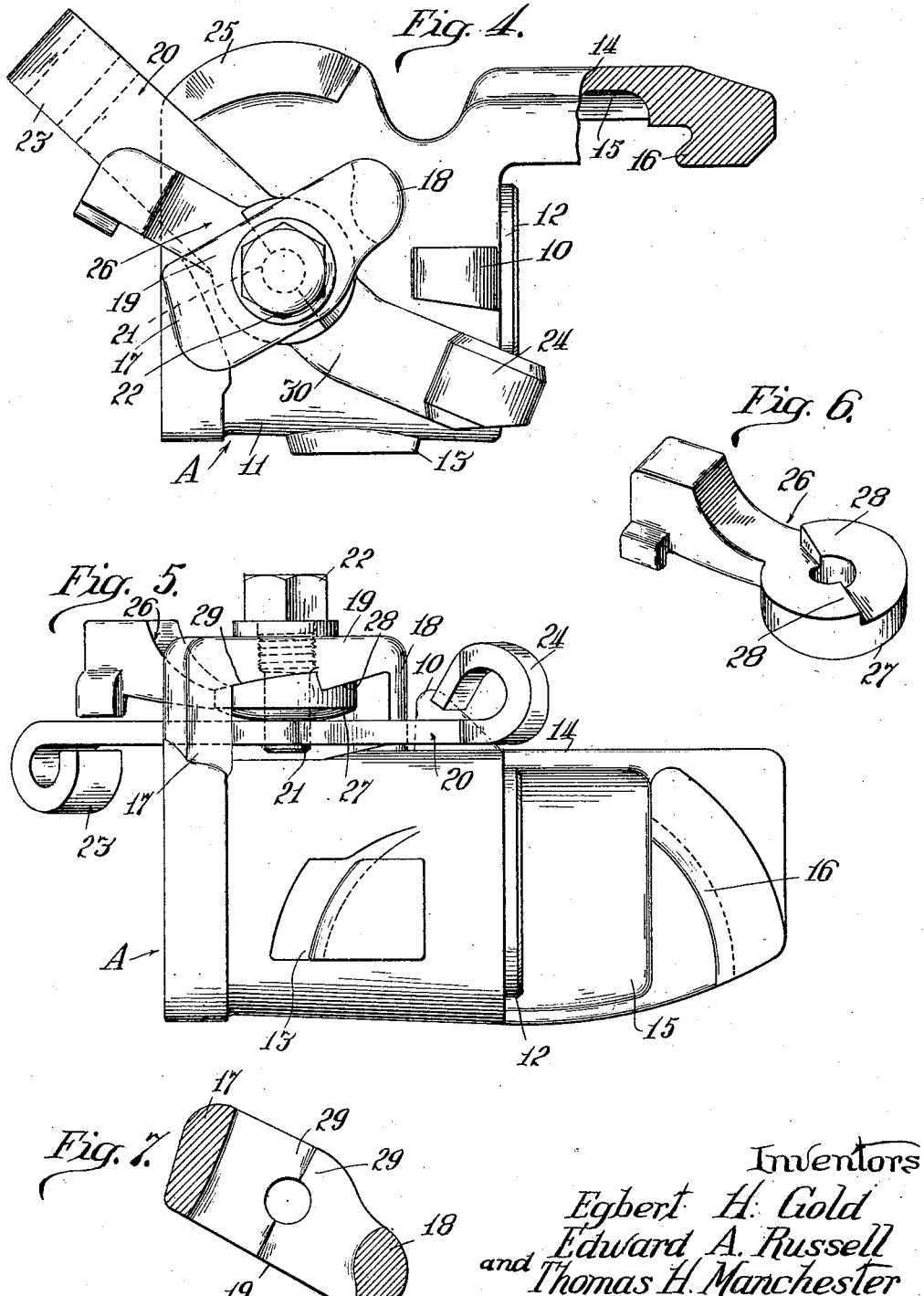

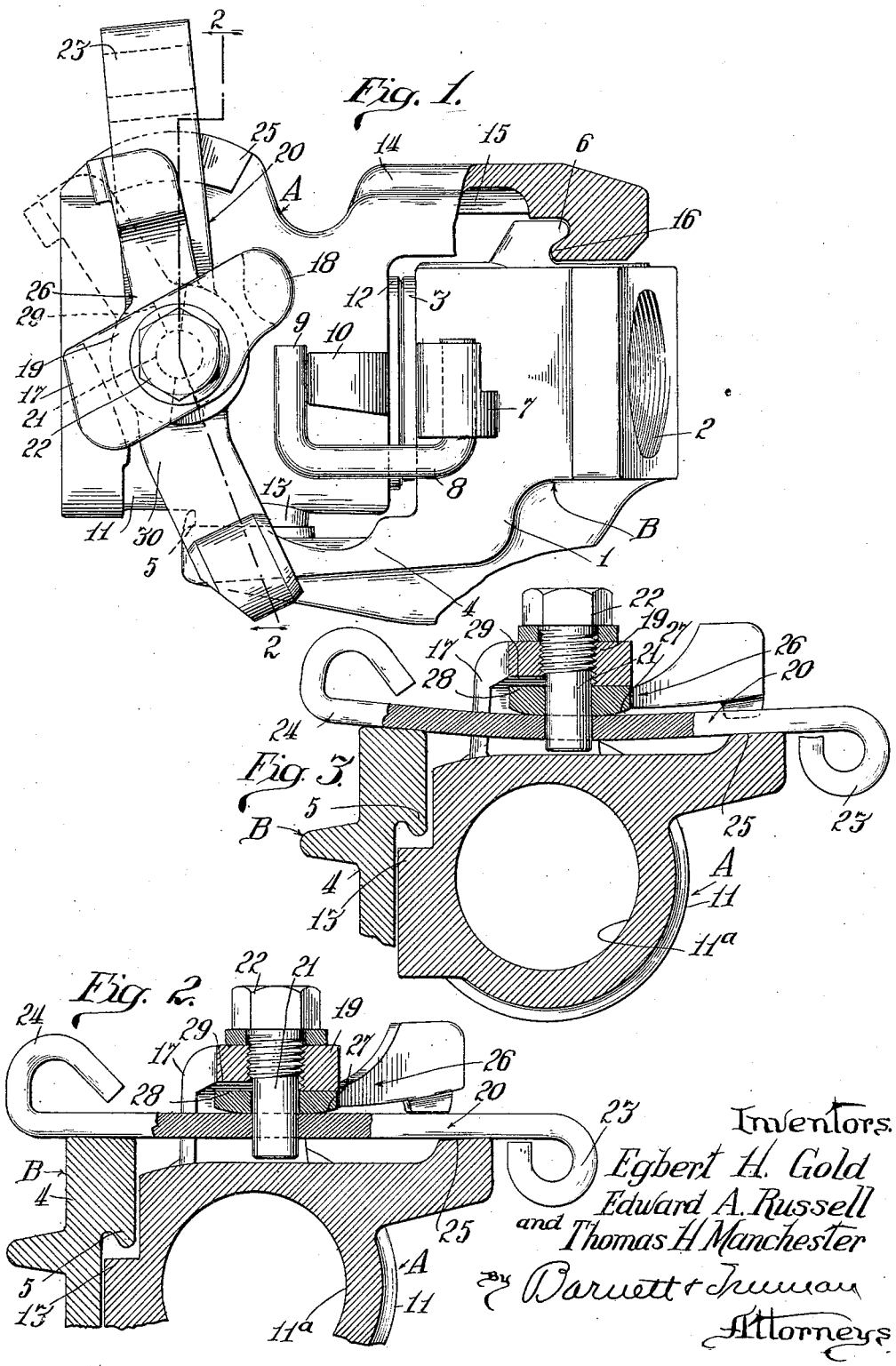

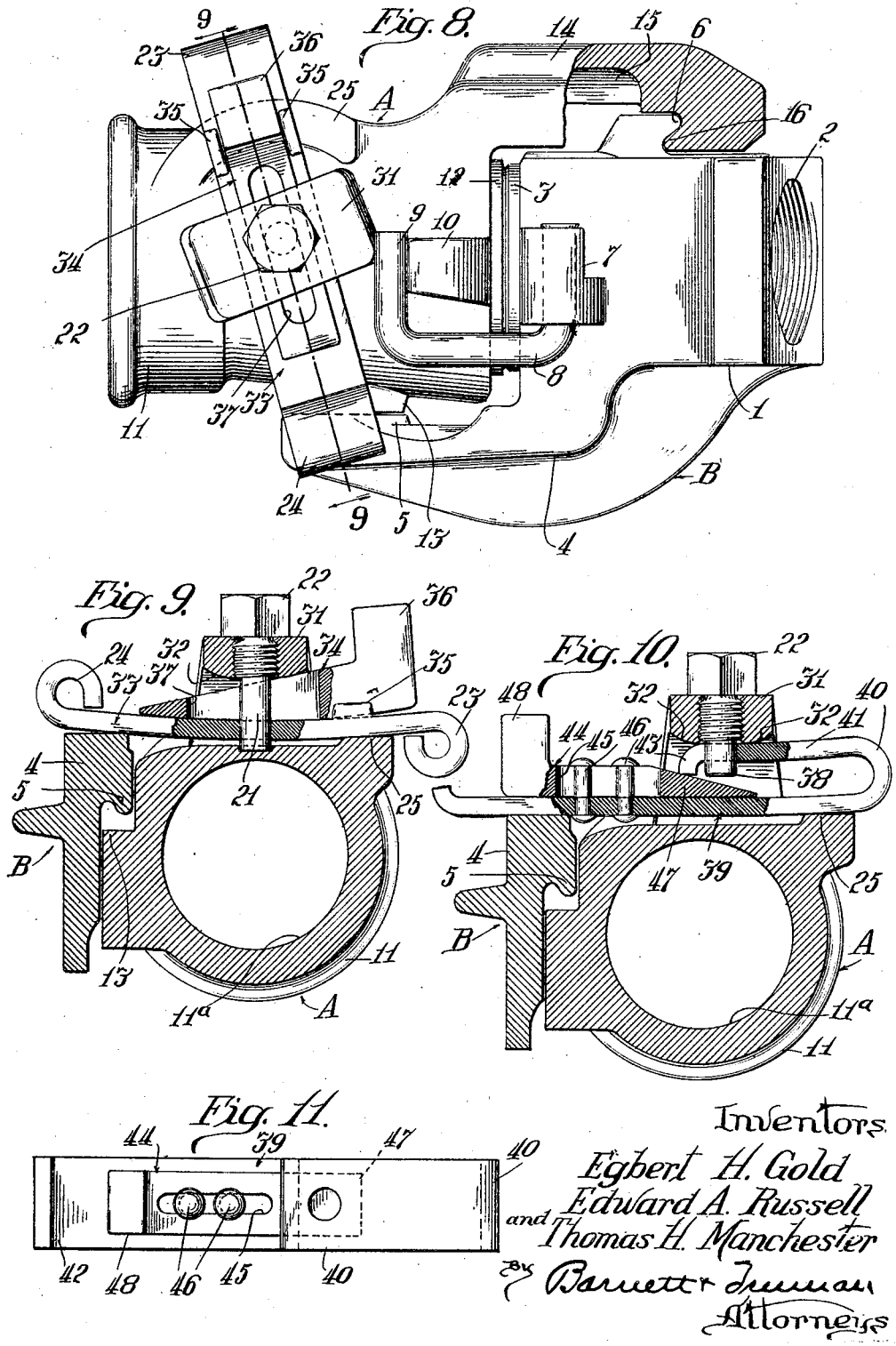

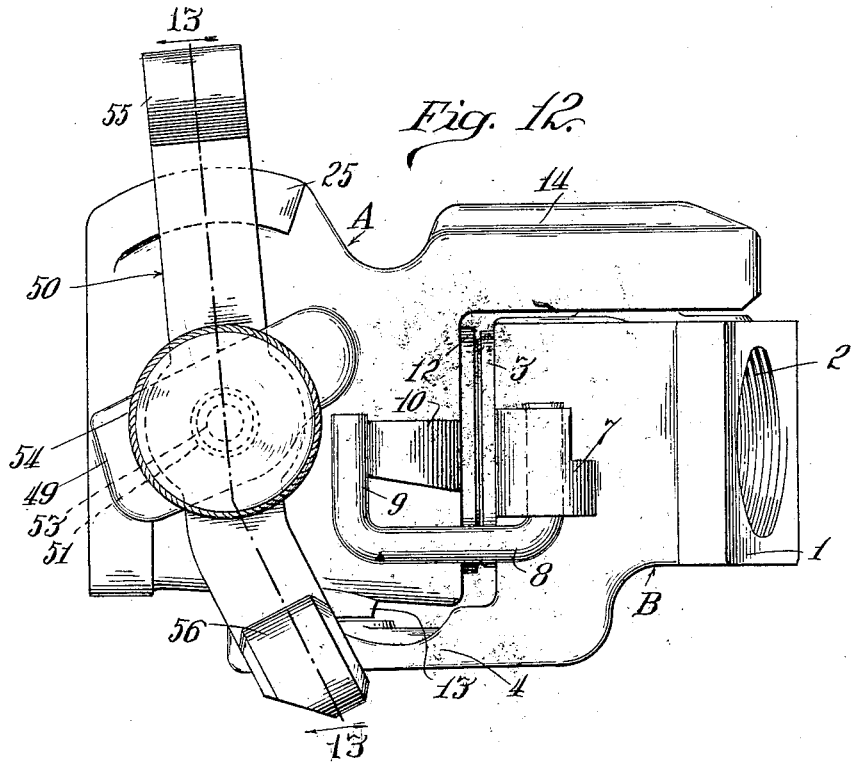
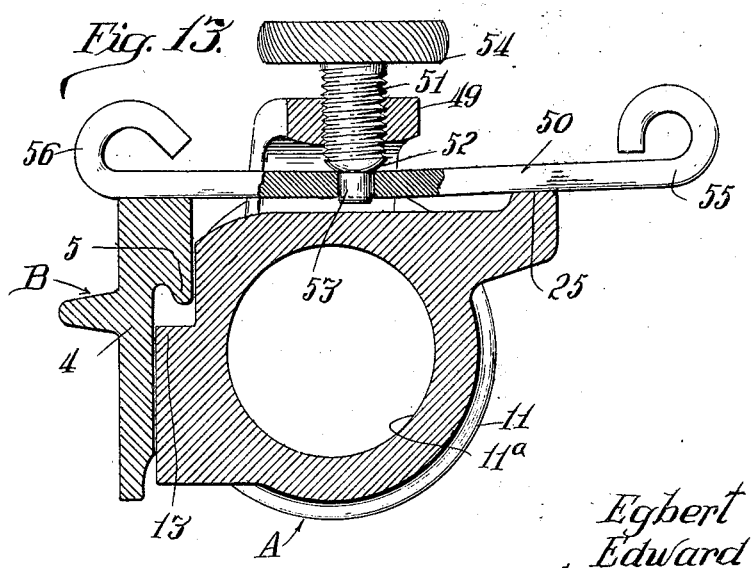

Patented Jan. 14, 1930

1,743,270

UNITED STATES PATENT OFFICE

EGBERT H. GOLD, OF EVANSTON, AND THOMAS H. MANCHESTER AND EDWARD A. RUSSELL, OF CHICAGO, ILLINOIS; SAID MANCHESTER AND SAID RUSSELL ASSIGNORS TO VAPOR CAR HEATING COMPANY, INC., OF CHICAGO, ILLINOIS, A CORPORATION OF NEW YORK; MARGARET JAYNE GOLD AND BISCAYNE TRUST COMPANY EXECUTORS OF SAID EGBERT H. GOLD, DECEASED

HOSE COUPLER

Application filed August 22, 1927. Serial No. 214,714.

This invention relates to hose couplings for connecting together the hoses or equivalent flexible metallic structures on the train pipes, steam or air, of railway cars; and the object of the invention is to provide, more particularly in couplings for steam train pipe connections, new and improved means for locking together the couplers or mating members of the coupling.

It has been customary to provide couplers with locking devices of one sort or another, which are forced with wedging pressure against the arms of the mating couplers to hold the couplers in locked relation as against the tendency to be rocked on their cams and disengaged by pull on the hoses when the train rounds a curve, for example. Such positive wedge locks are effective, so far as this purpose is concerned, but the wedging pressure, especially as the locks are frequently driven into place by a hammer, is likely, at least in case of certain types of wedge locks, to injure the gaskets and also to strain or bend the coupler arms and mutilate the cams. This invention relates to a type of wedge lock which will yield so that injury to the couplers and gasket is prevented and the efficiency of the lock increased and its manipulation made easier.

One object of the invention is to provide a locking device which is first swung to locking position and simultaneously wedged yieldably into engagement with the arms of a mating coupler, in combination with an auxiliary wedging device which is subsequently forced into place to insure a more positive locking engagement.

Another object is to provide a locking device of this type comprising a plurality of wedge members, operative at different times and on different portions of the yieldable locking member.

Other objects and advantages of this invention will be more apparent from the following detailed description of certain approved forms of the apparatus.

In the accompanying drawings:

Fig. 1 is a plan view of a hose coupler constructed in accordance with this invention, and shown as mated with a coupler of known construction.

Figs. 2 and 3 are vertical sections taken substantially on the line 2—2 of Fig. 1. Fig. 2 illustrates the position of the parts before the rotatable wedge is driven to locking position, and Fig. 3 is a similar view after the wedge has been rotated to locking position.

Fig. 4 is a plan view of the coupler head provided with the improved locking means, here shown as swung to disengaged or unlocked position.

Fig. 5 is a side elevation of the assembly shown in Fig. 4.

Fig. 6 is a perspective view of the rotatable locking cam or wedge.

Fig. 7 is an inverted plan showing the cams or wedge members on the under side of the bracket in which the locking members are pivoted.

Fig. 8 is a plan view similar to Fig. 1, showing a modified form of locking member.

Fig. 9 is a transverse vertical section taken substantially on the line 9—9 of Fig. 8.

Fig. 10 is a view, similar to Fig. 9, but illustrating a different form of locking device.

Fig. 11 is a plan view of the locking member and wedge shown in Fig. 10.

Fig. 12 is a plan view similar to Fig. 1, showing another modification.

Fig. 13 is a vertical section, taken substantially on the line 13—13 of Fig. 12.

Referring first to the form of the invention shown in Figs. 1 to 7 inclusive, a hose coupler is illustrated consisting of two members or couplers A and B; coupler A being provided with the lock of the present invention and the coupler B being a hose coupler of known type. The coupler of this invention is designed so that it will mate with any of the different types of so-called gravity hose couplers now in use on steam railroads in this country for making the connection between the steam train pipes on adjacent cars of railroad trains; coupler B being shown as typical or illustrative of couplers of this general class of which there are several different makes.

Coupler B consists of a head 1 formed with the steam port 2, in which is arranged a gasket 3, and with a forwardly projecting arm 4 provided with an undercut lug or cam 5, and on the other side of the head from arm 4 with a cam lug 6. Projecting from the top of head 1 is a lug 7 in which is pivoted a locking link 8, the angularly disposed end 9 of which is adapted to engage with a lug 10, formed on the mating coupler member.

The improved coupler A comprises a head 11 formed with a steam port 11ª, a gasket 12 being suitably positioned in a gasket seat at the outer end of port 11ª. On one side of the coupler head 11 is the usual under-cut lug or cam 13 adapted to be engaged by the cam 5 of coupler B. The arm 14 of coupler A consists of a curved or concavo-convex web portion 15 terminating in a thickened portion provided with a cam 16 for engagement with the cam 6 on the head of coupler B.

The improved locking device forming the subject matter of the present invention is carried by the coupler A. Arranged diagonally on top of and preferably cast integral with the head 11 is a housing or bracket consisting of upright members 17 and 18 and a connecting member 19. The locking bar 20 is intermediately pivoted to swing in a substantially horizontal plane on the downwardly projecting end 21 of bolt 22 screwed into the cross member 19 of the bracket. The locking member 20 is formed of a bar of resilient or spring metal, capable of yielding or flexing to some extent, and is preferably provided with return bent end portions 23 and 24 which serve as heads to be engaged by a hammer or other tool in the process of driving the locking member from one position to another. An arcuate cam or wedge surface 25 is formed on the upper face of head 11, concentric with the pivot pin 21. When the locking bar 20 is rotated to locking position, the end 23 of the bar will ride up over the cam or wedge surface 25 thereby tilting the bar so as to force the end 24 downwardly into firmer engagement with the arm 4 of the mating coupler.

A rotatable cam or wedge member 26 (best shown in Fig. 6), is pivoted on the pin or stud 21, between the locking bar 20 and the under face of cross bar 19 of the bracket. The lower face of this wedge member 26 is formed, concentrically with the pin 21, with a rounded or spherical surface 27 providing a rocking fulcrum for the locking bar 20. The upper surface of this portion of wedge member 26 is formed with a pair of similar arcuate wedge or cam surfaces 28, each 180° in length and concentric with the pin 21. Cooperating cam surfaces 29 are formed on the under face of the cross bar 19 of the bracket, as shown in Fig. 7. It will be apparent that as the wedge member 26 is rotated in one direction (clockwise, as shown in Figs. 1 to 4), the engaging cam or wedge surfaces 28 and 29 will force the cam member 26 downwardly, thereby moving down the fulcrum for the intermediate portion of locking bar 20 and forcing the end 24 of this locking bar downwardly into firmer engagement with the arm 4 of the mating coupler.

When in disengaged or unlocked position, the bar 20 is swung to the position shown in Figs. 4 and 5. It will be noted that the bar 20 is bent slightly to one side as shown at 30 so that the head 24 of the bar may swing completely clear of the arm 4 of the mating coupler, without having the intermediate portion of the locking bar engage the lug 10 on the head 11.

When a pair of couplers such as A and B have been brought into mating engagement with one another, by simultaneously swinging the cam 16 on arm 14 into engagement with the cam 6 on head 1, and swinging the cam 5 on arm 4 into engagement with the cam 13 on head 11, the locking bar 20 is swung or driven around clockwise to the position shown in Figs. 1, 2 and 3. The rotatable cam 26 will not partake in this swinging movement of locking bar 20, but will remain substantially in its original position as indicated in dotted lines in Fig. 1. The end 23 of locking bar 20 will ride up the fixed wedge 25, and the intermediate portion of locking bar 20 will pivot on the fulcrum provided by the curved surface 27 on the lower side of wedge member 26 so that the opposite end 24 of the locking bar will be forced downwardly upon the arm 4 of mating coupler B, as the locking bar 20 is swung to locking position. However, during this portion of the locking operation, the engagement between bar 20 and arm 4 will not be particularly forceful, and the bar 20 can easily yield to prevent injury to any of the engaging parts. This position of the parts is indicated in Fig. 2. When the bar 20 has been moved completely to locking position, the cam member 26 is driven in a clockwise direction so as to force the cam or wedge surfaces 28 to slide over the corresponding surfaces 29 on the under face of the bracket, and thus force the fulcrum surface 27 of the wedge member down against the intermediate portion of locking bar 20. This will serve to flex this bar, or place it under added tension, as indicated in Fig. 3, so that a very tight engagement of the locking bar with both the wedge surface 25 and the mating arm 4 is accomplished. The unlocking operation will be simply the reverse of the movements hereinabove described.

When a coupler of type A is coupled with a coupler of type B, as shown in Fig. 1, the locking link 8 may be swung into engagement with lug 10 after the locking bar 20 has been moved to locking position. When two similar couplers A, each equipped with this improved locking means, are coupled with one another, each of the locking devices will be driven to locking position in the manner hereinabove described. In such a combination there will be no coupler link 8, and the lugs 10 on the coupler heads will not be used, these being provided for use merely when one of the improved couplers A is connected with an old type coupler such as B.

It is not absolutely essential that the locking member 20 be yieldable, and some of the advantages of this invention would be retained if a rigid locking bar were used. However, it is preferable, and a better operation is obtained and there is less likelihood of injury to any of the parts, if the locking bar is formed of spring material capable of yielding to a limited extent.

A modified form of locking member is illustrated in Figs. 8 and 9. The coupler members A and B, and all parts thereon, are the same as already described in connection with Figs. 1 to 7, except as hereinafter noted. In this form of the invention, the under surface of the cross bar 31 of the bracket is not provided with the cams 29, but is formed with a curved or rounded surface 32. The locking bar 33 is quite similar to the locking bar 20 already described, having an end 23 adapted to ride up on the fixed arcuate wedge 25, an intermediate portion pivoted on pin 21, and an end 24 adapted to engage the arm 4 of the mating coupler. A longitudinally movable wedge member 34 is slidably carried on the upper surface of locking bar 33 between a pair of guide lugs 35, and is provided with a driving head 36 at its larger end. The smaller end of the wedge 34 is provided with an elongated vertical slot 37 through which pivot pin 21 passes, this portion of the wedge being interposed between the rounded lower surface 32 of the bracket 31 and the upper face of locking bar 33.

The assembly consisting of locking bar 33 and wedge 34 are pivoted to swing about the pin 21, and fulcrum against the lower surface 32 of the bracket. This locking assembly is first swung in a clockwise direction to locking position, in the same manner as the form of invention first described. One end of the locking bar will be forced up the fixed wedge surface 25, thereby forcing the other end down into yielding engagement with the arm 4 of the mating coupler. After being swung to this locking position, the wedge 34 is driven in, toward the bracket 31, by striking the head 36 with a hammer or suitable tool. This will interpose a thicker portion of the wedge member between the bracket and the locking bar 33, thereby flexing the locking bar or placing it under added tension, in the same manner as was accomplished by the rotatable wedge member 26 in the form of the invention first described.

Another modified form of the invention is illustrated in Figs. 10 and 11. The coupler A and the bracket 31 may be the same as already described in connection with Figs. 8 and 9. The end 38 of the pivot pin or bolt is shorter than in the forms hereinbefore described, and the spring locking bar consists of a lower bar member 39 which is not directly pivoted upon pin 38, but is provided at one end 40 with a return bent portion joining with an upper arm 41 which is pivoted upon the pin 38. This return bent end 40 is adapted to ride upon the fixed arcuate cam 25 on head 11. The other free end 42 of the locking bar is adapted to engage the upper surface of arm 4 of the mating coupler. The free end 43 of the upper arm 41 of the locking bar, beyond the pivot pin 38 is bent downwardly, but not into engagement with the lower bar 39 of the locking member, so that the entire length of this lower bar will be free to flex during the initial swinging movement of the locking member to locking position. A slidable wedge member 44 is longitudinally slotted at 45 to engage a pair of guide pins 46 secured in the lower bar 39 of the locking member. The tapered end 47 of wedge member 44 is adapted to be driven between the upper surface of bar 39 and the down-turned end 43 of the upper return-bent portion 41 of the locking member. The larger end of the wedge is provided with a head 48 whereby it may be driven into or out of locking engagement.

As in the other forms of the invention hereinabove described, the locking member is first rotated to locking position by swinging the yieldable locking bar about the pivot pin 38. The wedge member 44 is then driven in (toward the right in Fig. 10), between the upper and lower leaves of the spring bar so as to produce a further flexure of this bar or place it under added tension, thereby securing a firm locking engagement with the arm 4 of the mating coupler.

Still another modification is illustrated in Figs. 12 and 13. The couplers A and B are substantially the same as already described, with the exception that the under surface of the bracket 49 need not be provided with either cam surfaces as in Figs. 1 to 7, or with a spherical fulcrum surface as in Figs. 8 to 11, since the locking bar 50 does not contact directly with the bracket. The screw 51, adjustably mounted in bracket 49, is provided with a rounded or spherical lower end portion 52, from which projects the pin or stud 53 on which the locking bar 50 is pivoted. Screw 51 is provided with a hand-wheel or a nut 54 at its upper end whereby it may be adjusted up and down in the bracket 49. The locking bar 50 may be substantially of the form shown and described in connection with Figs. 1 to 7.

As in previously described forms of the invention, the locking bar is first swung clockwise (Fig. 12) into engagement with the arm 4 of the mating coupler, the end 55 of the bar riding up the wedge 25 so that the bar will pivot about the curved fulcrum surface 52 of the screw, thus swinging the end 56 of the bar down into engagement with the arm 4. After being swung to this locking position, the screw 51 is adjusted downwardly by turning the hand wheel or nut 54, thus placing the bar 50 under added tension and forcing it into secure locking engagement with arm 4 of the mating coupler. It will be noted that in this form of the invention the screw 51 serves the functions of both the pivot pin 21 and the rotatable wedge or cam 26, as shown in Figs. 1 to 7.

It will be apparent that all forms of the invention, as described, would be operative to some extent if the fixed arcuate wedge member 25 were omitted, the movable wedge members being relied upon entirely to secure the yielding locking engagement after the spring bar has been swung to its operative position. However, it is desirable that the fixed wedge 25 be utilized to secure an initial locking engagement, after which the movable wedge is moved to its locking position to tighten this locking engagement as may be desired or found necessary.

We claim:

1. In combination with a hose coupler comprising a head and a projecting arm adapted to engage respectively with the arm and head of a mating coupler, a locking member supported on the head and adapted to yieldingly engage the arm of a mating coupler, a wedge member engaged by the locking member when moved to locking position to effect an initial tension in the member, and a second wedge member adapted to be moved to increase the tension of the locking member after it has been moved to locking position.

2. A hose coupler comprising a head provided with a wedge surface and a projecting arm, the head and arm having means adapted to engage with the arm and head respectively of a mating coupler, a yieldable locking member movably mounted on the head and adapted to engage when in locking position the wedge surface and the arm of the mating coupler, and auxiliary means for increasing the pressure of the locking member upon the arm after the locking member has been moved to locking position.

3. A hose coupler comprising a head provided with a wedge surface and a projecting arm, the head and arm having means adapted to engage with the arm and head respectively of a mating coupler, a spring locking member movably mounted on the head and adapted when moved into locking engagement with the arm of a mating coupler to be placed under tension by the wedge surface, and a movable wedge member for increasing the tension of the locking member after it has been moved to locking position.

4. A hose coupler comprising a head provided with a wedge surface and a projecting arm, the head and arm having means adapted to engage with the arm and head respectively of a mating coupler, a yieldable locking member intermediately pivoted on the head and adapted when swung to locking position to yieldably engage at its respective ends with the wedge surface and the arm of the mating coupler, and means for increasing the tension of the locking member after it has been moved to locking position.

5. A hose coupler comprising a head provided with a wedge surface and a projecting arm, the head and arm having means adapted to engage with the arm and head respectively of a mating coupler, a yieldable locking member intermediately pivoted on the head and adapted when swung to locking position to yieldably engage at its respective ends with the wedge surface and the arm of the mating coupler, and a movable wedge member for increasing the tension of the locking member after it has been moved to locking position.

6. A hose coupler comprising a head provided with a wedge surface and a projecting arm, the head and arm having means adapted to engage with the arm and head respectively of a mating coupler, a yieldable locking member intermediately pivoted on the head and adapted when swung to locking position to yieldably engage at its respective ends with the wedge surface and the arm of the mating coupler, and a rotatable wedge member coaxially pivoted with the locking member for increasing the tension of the locking member after it has been moved to locking position.

7. A hose coupler comprising a head provided with a wedge surface and a projecting arm, the head and arm having means adapted to engage with the arm and head respectively of a mating coupler, a bracket on the head having a downwardly projecting portion, a yieldable locking member intermediately pivoted beneath the bracket and adapted when rotated to locking position to yieldingly engage at its respective ends the wedge surface and the arm of the mating coupler, and a rotatable wedge member coaxially pivoted with the wedge member so that when rotated a thicker portion thereof will be forced between the intermediate portion of the locking member and the downwardly projecting portion of the bracket.

8. A hose coupler comprising a head provided with a wedge surface and a projecting arm, the head and arm having means adapted to engage with the arm and head respectively of a mating coupler, a bracket on the head, a yieldable locking member intermediately pivoted beneath the bracket and adapted when rotated to locking position to yieldingly engage at its respective ends the wedge surface and the arm of the mating coupler, there being an arcuate cam surface formed on the lower face of the bracket about the axis of the locking member, and a rotatable member pivoted coaxially with the locking member between the locking member and the bracket, the rotatable member having an arcuate cam surface formed on its upper side adapted to cooperate with the cam surface on the bracket to increase the tension of the locking member.

9. A hose coupler comprising a head provided with a wedge surface and a projecting arm, the head and arm having means adapted to engage with the arm and head respectively of a mating coupler, a bracket on the head, a yieldable locking member intermediately pivoted beneath the bracket and adapted when rotated to locking position to yieldingly engage at its respective ends the wedge surface and the arm of the mating coupler, and a movable fulcrum member interposed between the locking member and the bracket.

10. A locking member for a hose coupler comprising a pivoted spring bar, and a cooperating wedge member co-axially pivoted with the bar.

11. A hose coupler comprising a head provided with a wedge surface and a projecting arm, the head and arm having means adapted to engage respectively with the arm and head of a mating coupler, a locking member intermediately pivoted on the head and adapted when rotated to locking position to engage at its respective ends the wedge surface and the arm of the mating coupler, and a movable fulcrum member engaging the intermediate portion of the locking member.

12. In combination with a hose coupler comprising a head and a projecting arm adapted to engage respectively with the arm and head of a mating coupler, a locking member mounted on the head and adapted to be moved into engagement with the arm of the mating coupler, and a plurality of wedge members adapted to engage spaced portions of the locking member when in locking position.

13. In combination with a hose coupler comprising a head and a projecting arm adapted to engage respectively with the arm and head of a mating coupler, a locking member mounted on the head and adapted to be moved into engagement with the arm of the mating coupler, a wedge member engaged by the locking member while being moved to locking position to exert an initial pressure on the arm, and a second wedge member adapted to be moved to increase the pressure of the locking member on the arm after it has been moved to locking position.

14. In combination with a hose coupler comprising a head and a projecting arm adapted to engage respectively with the arm and head of a mating coupler, a resilient locking member mounted on the head and adapted to be moved into position over the arm of the mating coupler, and means for subsequently flexing the member to force it into firm locking engagement with the arm.

15. A hose coupler comprising a head provided with a wedge surface and a projecting arm, a bracket on the head, a locking bar intermediately pivoted in the bracket and adapted when swung to locking position to engage at its respective ends with the wedge surface and the arm of a mating coupler, and means for subsequently exerting pressure on an intermediate portion of the bar to force it against the arm.

16. A hose coupler comprising a head provided with a wedge surface and a projecting arm, a bracket on the head, a locking bar intermediately pivoted in the bracket and adapted when swung to locking position to engage at its respective ends with the wedge surface and the arm of a mating coupler, and a movable wedge for subsequently forcing the central portion of the bar against the arm.

17. In combination with a hose coupler comprising a head, a locking member swiveled on the head so that when rotated in one direction a portion of the member will swing into engagement with a mating coupler, means on the head engaged by another portion of the locking member during this swinging movement for tilting the member at right angles to its plane of rotation into locking engagement with the mating coupler, and means mounted on the head for subsequently forcing the locking member in the direction of its preceding tilting movement into firmer engagement with the mating coupler.

18. In combination with a hose coupler comprising a head, a locking member swiveled on the head so that when rotated in one direction a portion of the member will swing into engagement with a mating coupler, means on the head engaged by another portion of the locking member during this swinging movement for tilting the member at right angles to its plane of rotation into locking engagement with the mating coupler, and a wedge member engaging the swiveled portion of the locking member for subsequently forcing the member into firmer engagement with the mating coupler.

19. In combination with a hose coupler comprising a head, a resilient locking member swiveled on the head so that when rotated in one direction a portion of the member will swing into engagement with a mating coupler, means on the head engaged by another portion of the locking member during this swinging movement for tilting the member at right angles to its plane of rotation into locking engagement with the mating coupler, and means mounted on the head for subsequently flexing the locking member to increase its locking pressure on the coupler members.

EGBERT H. GOLD.
THOMAS H. MANCHESTER.
EDWARD A. RUSSELL.